Aug. 8, 1961 S. A. MURAWSKI 2,994,982
ARTIFICIAL FISHING LURE
Filed March 24, 1959
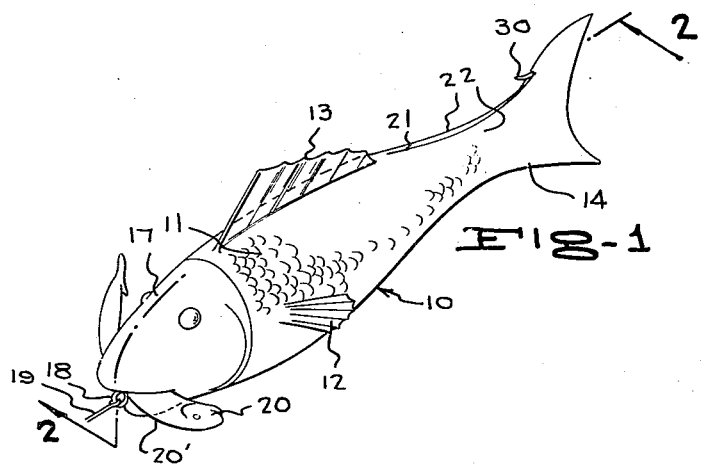
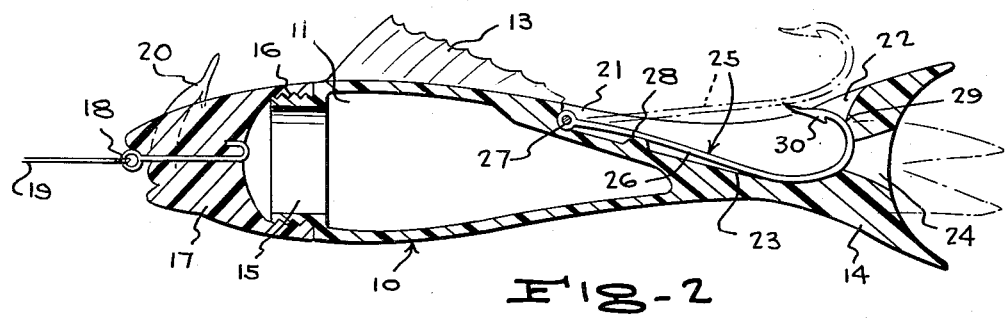
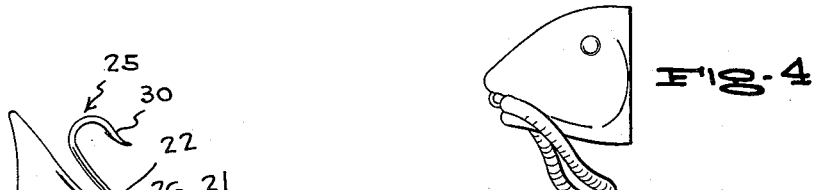
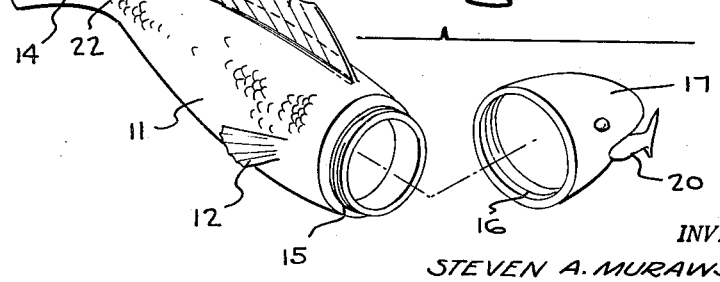
INVENTOR.
STEVEN A. MURAWSKI
BY
Christian R. Nielsen
ATTORNEY

2,994,982
ARTIFICIAL FISHING LURE
Steven A. Murawski, 13422 Avenue K, Chicago, Ill.
Filed Mar. 24, 1959, Ser. No. 801,561
2 Claims. (Cl. 43—35)

This invention relates to artificial fishing lure and it consists in the constructions, arrangements and combinations herein described and claimed.

It is the cardinal object of the invention to provide an artificial fishing lure which is so constructed as to attract fish thereto due to the fact that the lure will have every appearance of a live minnow or the like and in which the hook is concealed from fish approaching the lure, which latter feature provides a lure which is also free of any possibility of becoming entangled in foreign matter, such as weeds and the like.

More specifically, it is an important object of the invention to provide a lure formed from a soft plastic material, in hollow formation, the exterior surfaces of which include the usual appurtenances of a live minnow, such as a tail, head and fins, the tail and fins being of relatively thin plastic material so as to partake of shimmering motions similar to a live minnow when in motion, the head portion being separable from the body to vary the weight of the lure by the addition of water or other weight means so as to permit use of the lure in shallow or deep water fishing; and wherein, the tail portion of the lure is provided with an interior channel for full concealment of the hook which is releasable for movement exteriorly of the lure body upon receiving a strike from a fish; and said channel further providing passage of water therethrough for imparting motion to portions of the tail member.

Additional objects, advantages and features of invention will be apparent from the following description, considered in conjunction with the accompanying drawing, wherein, FIGURE 1 is a perspective view of the lure constructed in accordance with the invention, FIGURE 2 is a longitudinal section taken on the line 2—2 of FIGURE 1, and FIGURE 3 is an exploded perspective view of the lure with the hook sprung into operative position.

FIGURE 4 is a side elevation of a head supporting a different type of bait from that shown in FIGURE 1.

There is illustrated an artificial lure generally indicated by the reference character 10, consisting of a hollow body portion 11, having fins 12, a dorsal fin 13 and tail portion 14, all of which may be suitably molded from soft pliable plastic materials, which may be colored to produce a desired effect to attract fish.

The body of the lure 10 opposite the tail portion 14 is open and has a reduced threaded collar 15 which preferably is of greater rigidity than the body enabling threaded engagement with screw threads 16 formed internally of the head 17 of the fish.

The head 17 of the lure is provided with an eyelet 18 for securement of a fishing line 19 and at the forward end of the head, a miniature facsimile of a small minnow or the like 20 is secured by a molding operation or otherwise. As clearly shown in FIGURE 1, the minature minnow or worm, as the case may be, is disposed at an angle to the forward travel of the lure under trolling action, the forward edge 20' being quite thin, thus fending weeds and the like out of the path of the lure, and to this end, the miniature minnow or the like, should be of a length slightly greater than the transverse width of the lure body.

The body portion 11 is formed with an interior channel 21 upon the upper side of the lure 10, extending in a downward direction from a position rearwardly of the dorsal fin 13 to a point adjacent the terminal end of the tail. The channel 21 is formed by respective thin side walls 22 and a bottom wall 23, the outer upper and lower ends of the side walls being welded or cemented together and forming an open rear end 24 through the tail portion.

A hook 25 which comprises a shank 26 is pivotally connected in the body as indicated at 27 presenting the hook 25 between the side walls 22, inwardly of the terminal ends of the tail portion.

The bottom wall 23 of the channel is provided with a raised portion 28 acting as a fulcrum for the shank 26 of the hook to provide a tension thereon, when the hook 25 is engaged at the upper juncture 29 of the side walls of the tail portion. It will be noted that the barbed end 30 of the hook lies within the channel and beneath the upper portion of the tail 14, by which construction, the barbed end 30 is well concealed and avoids liability of entanglement with weeds or the like.

The head 17 being detachably connected to the hollow body of the lure permits the addition of water or other weight means for varying the weight of the lure for deep fishing; or by removing such weight means, the lure will be lightened for shallow water fishing. Also, by the provision of a detachable head, a head with a different type of miniature bait 20 may be readily substituted.

In use, the line 19 associated with the lure as shown, and connected to a reel (not shown) will be employed to draw the lure through the water, and prior to a strike from a fish, the hook will be in the position shown in FIGURE 1. As the lure is drawn through the water, the fins 12 and the dorsal fin 13 will partake of shimmering movements due to the lightness and flexibility thereof, thus simulating the motions of a live minnow. Also, water passing through the channel 21 and exiting through the open rear end of the tail 14 will impart a shimmering motion to the terminal ends of the tail, further arousing the curiosity of approaching fish. Upon receiving a strike from a fish, the tail portion 14 being of soft pliable plastic material will partially collapse, as shown in dotted lines in FIGURE 2, releasing the hook, which, due to the fulcrum 28 is under a tension sufficient to project the barbed portion 30 into the mouth of the fish.

It will be seen that due to the realistic appearance of the lure, due to natural motions of the fins and the tail portions, as well as water disturbances created by the channel 21, a pursuing fish will more eagerly attempt to strike the lure, and while I have shown and described a preferred construction of the lure, this is by way of illustration only, and I consider as my own all such modifications in construction as fairly fall within the scope of the appended claims.

I claim:
1. A fish lure comprising a hollow body member of soft pliable plastic material, said body having fins of thin flexible structure providing motions simulating movements of a live minnow upon passage of the lure through the water, said body member further having a head member and a tail member, the upper rear portion of said body having a downwardly and rearwardly inclined channel, said channel opening upon the upper side of the body and having an exit opening through the tail member to permit passage of water through the channel and said exit opening, a hook member disposed within the channel, the shank of the hook member being pivotally mounted in an upper foremost portion of the channel, an abutment in the base of said channel for contacting engagement with the shank of the hook member and said shank having a bight portion for frictional contacting engagement with the upper rearmost portion of said channel for retention of the hook in a concealed position within the channel, said hook being releasable upon compressive force upon the tail member of the lure.

2. A fish lure comprising a hollow body member of soft pliable plastic material, said body having fins of thin flexible structure providing motions simulating movements of a live minnow upon passage of the lure through the water, said body member further having a head member and a tail member, the upper rear portion of said body member having a downwardly and rearwardly inclined channel, said channel opening upon the upper side of the body member and having an exit opening through the tail member to permit passage of water through the channel and said exit opening, a hook member disposed within the channel, the shank of the hook member being pivotally mounted in an upper foremost portion of the channel, an abutment in the base of said channel for contacting engagement with the shank of the hook member and said shank having a bight portion for frictional contacting engagement with the upper rearmost portion of said channel for retention of the hook in a concealed position within the channel, said hook member being releasable upon compressive force upon the tail member of the lure, said head member having a miniature replica of a minnow or the like fixed thereto and extending transversely thereof at an angle to the forward motion of the lure, said head being detachable for interchanging head members embodying different miniature replicas as well as for increasing or decreasing the weight of the lure by the addition or reduction of weight means within the hollow body of the lure.

References Cited in the file of this patent

UNITED STATES PATENTS

| | | |
|---|---|---|
| 994,927 | Jefferson | June 13, 1911 |
| 1,296,701 | Sakave | Mar. 11, 1919 |
| 2,233,684 | Strite | Mar. 4, 1941 |
| 2,556,702 | Nielsen | June 12, 1951 |
| 2,568,547 | Hoffman | Sept. 18, 1951 |
| 2,746,200 | Dale | May 22, 1956 |

FOREIGN PATENTS

| | | |
|---|---|---|
| 15,568 | Great Britain | 1910 |